(12) United States Patent
Saito et al.

(10) Patent No.: US 10,414,432 B2
(45) Date of Patent: Sep. 17, 2019

(54) VEHICLE DISPLAY DEVICE

(71) Applicant: SUBARU CORPORATION, Tokyo (JP)

(72) Inventors: Hirotaka Saito, Tokyo (JP); Junya Seki, Tokyo (JP); Kazufumi Suzuki, Tokyo (JP); Yuki Osada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 23 days.

(21) Appl. No.: 15/487,369

(22) Filed: Apr. 13, 2017

(65) Prior Publication Data

US 2017/0305460 A1   Oct. 26, 2017

(30) Foreign Application Priority Data

Apr. 22, 2016  (JP) ................. 2016-085769

(51) Int. Cl.
*G01C 21/36* (2006.01)
*B62D 6/00* (2006.01)
(Continued)

(52) U.S. Cl.
CPC .............. *B62D 6/001* (2013.01); *B60K 35/00* (2013.01); *B60R 1/00* (2013.01); *G01C 21/3632* (2013.01);
(Continued)

(58) Field of Classification Search
CPC .... G01C 21/3632; B62D 6/001; B60K 35/00; B60K 2350/1028; B60K 2350/2013;
(Continued)

(56) References Cited

U.S. PATENT DOCUMENTS

| 5,402,120 A * | 3/1995 | Fujii | G01C 21/3632 340/988 |
| 2008/0215238 A1* | 9/2008 | Geelen | G01C 21/3655 701/414 |

(Continued)

FOREIGN PATENT DOCUMENTS

| JP | 09-189565 A | 7/1997 |
| JP | 5177105 B2 | 4/2013 |

(Continued)

OTHER PUBLICATIONS

Office Action issued in corresponding Japanese Patent Application No. 2016-085769, dated Mar. 13, 2018.
(Continued)

*Primary Examiner* — Genna M Mott
(74) *Attorney, Agent, or Firm* — McDermott Will & Emery LLP

(57) ABSTRACT

Provided is a vehicle display device configured to be mounted on a vehicle. The vehicle display device includes a curve detection unit, a road state categorization unit, and a display unit. The curve detection unit detects a curve that is included in a target traveling line and has a curvature. The road state categorization unit categorizes a state of the road on which the target traveling line including the curve is set, in one class out of a plurality of classes, according to possibility of presence of the curve having the curvature of a predetermined value or more. The display unit displays a representation that indicates the curvature of the curve. The curvature corresponds to the class in which the state of the road has been categorized.

2 Claims, 5 Drawing Sheets

(51) Int. Cl.
*B60K 35/00* (2006.01)
*B60R 1/00* (2006.01)
*G06K 9/00* (2006.01)

(52) U.S. Cl.
CPC .......... *G06K 9/00* (2013.01); *G06K 9/00798* (2013.01); *G06K 9/00805* (2013.01); *B60K 2370/1438* (2019.05); *B60K 2370/152* (2019.05); *B60K 2370/1529* (2019.05); *B60K 2370/177* (2019.05); *B60K 2370/21* (2019.05); *B60R 2300/107* (2013.01); *B60R 2300/8086* (2013.01); *B60R 2300/8093* (2013.01)

(58) Field of Classification Search
CPC ......... B60K 2350/106; G06K 9/00798; G06K 9/00805; B60R 1/00; B60R 2300/8086; B60R 2300/8093; B60R 2300/107
See application file for complete search history.

(56) References Cited

U.S. PATENT DOCUMENTS

| | | | |
|---|---|---|---|
| 2014/0092237 | A1 | 4/2014 | Watanabe et al. |
| 2015/0134180 | A1* | 5/2015 | An .......................... G01C 21/34 701/23 |
| 2015/0233722 | A1* | 8/2015 | Faaborg .................. G01C 21/34 340/995.27 |

FOREIGN PATENT DOCUMENTS

| | | |
|---|---|---|
| JP | 2015-087268 A | 5/2015 |
| WO | 2012/172842 A1 | 12/2012 |

OTHER PUBLICATIONS

Japanese Office Action issued in corresponding Japanese Patent Application No. 2016-085769, dated Oct. 16, 2018, with English Translation.

* cited by examiner

VEHICLE DISPLAY DEVICE

CROSS-REFERENCE TO RELATED APPLICATIONS

The present application claims priority from Japanese Patent Application No. 2016-085769 filed on Apr. 22, 2016, the entire contents of which are hereby incorporated by reference.

BACKGROUND

The technology relates to a vehicle display device mounted on a vehicle such as an automobile.

Various proposals have been put forward for display devices in vehicles such as automobiles. The display devices recognize environment forward of a vehicle using various kinds of periphery recognition units, and display an image including information on, for example but not limited to, a lane shape and an obstacle.

Use of such display devices makes it possible for an occupant of the vehicle to acquire more information than as obtained visually by the occupant himself or herself. The display devices are therefore useful, not only as a driving assistant when the occupant drives the vehicle as a driver, but also for purposes of the occupant's supervision of validity of an automatic operation control in automatic operation of the vehicle.

As an example of existing techniques regarding such display devices, Japanese Patent (JP-B) No. 5177105 makes a proposal for a display device that provides image display for assistance with vehicle operation. The display device displays an image that allows for comparison of an ideal traveling locus when the vehicle is traveling along a curve ahead, with a predicted traveling locus when the vehicle is traveling along the curve ahead at a current speed. In this case, the ideal traveling locus and the predicted traveling locus are selected from a plurality of kinds of locus shape patterns stored in advance. The plurality of kinds of the locus shape patterns has different radii of curves from one another.

SUMMARY

Such display devices are mounted on the vehicle that performs the automatic operation, and utilized for the occupant's check of the situation around the vehicle. However, providing elaborate display of the recognized situation around the vehicle on every occasion may force the occupant into compulsory recognition on every occasion. This may reduce an effect of the automatic operation, i.e., alleviation of a burden on the occupant.

For example, in a case in which the vehicle is traveling at a substantially constant speed on a high-standard road such as a highway and an expressway, the occupant's main concern is whether or not the vehicle normally recognizes a curved road, i.e., a curved path, forward of the vehicle. Excessively elaborate information may not be important for the occupant's trust in an automatic operation control.

It is therefore desirable to provide a vehicle display device that makes it possible to alleviate a burden of supervision on an occupant in automatic operation of the vehicle.

An aspect of the technology provides a vehicle display device mounted on a vehicle provided with an environment recognition unit, a traveling line setting unit, and an automatic operation control unit. The environment recognition unit recognizes environment including a road forward of the vehicle. The traveling line setting unit sets a target traveling line of the vehicle, on a basis of a recognition result of the environment recognition unit. The automatic operation control unit controls the vehicle to allow the vehicle to travel along the target traveling line. The vehicle display device includes a curve detection unit, a road state categorization unit, and a display unit. The curve detection unit detects a curve that is included in the target traveling line and has a curvature. The road state categorization unit categorizes, on a basis of a detection result of the curve detection unit, a state of the road on which the target traveling line including the curve is set, in one class out of a plurality of classes, according to possibility of presence of the curve having the curvature of a predetermined value or more. The display unit displays, on a basis of a categorization result of the road state categorization unit, a representation that indicates the curvature of the curve. The curvature corresponds to the class in which the state of the road has been categorized.

DETAILED DESCRIPTION

A vehicle display device according to one example implementation of the technology is intended to alleviate a disadvantage of a large burden of supervision on an occupant in automatic operation. The vehicle display device may determine, prior to passage of a vehicle through a curved path in automatic operation, whether or not high possibility of presence of a sharp curve such as a branch and a joint is attributed to a road. In accordance with a determination result, the vehicle display device may provide display of gentleness and sharpness of the curve included in the curved path, in two patterns.

In the following, some implementations of the technology are described with reference to the drawings.

Figure 1:
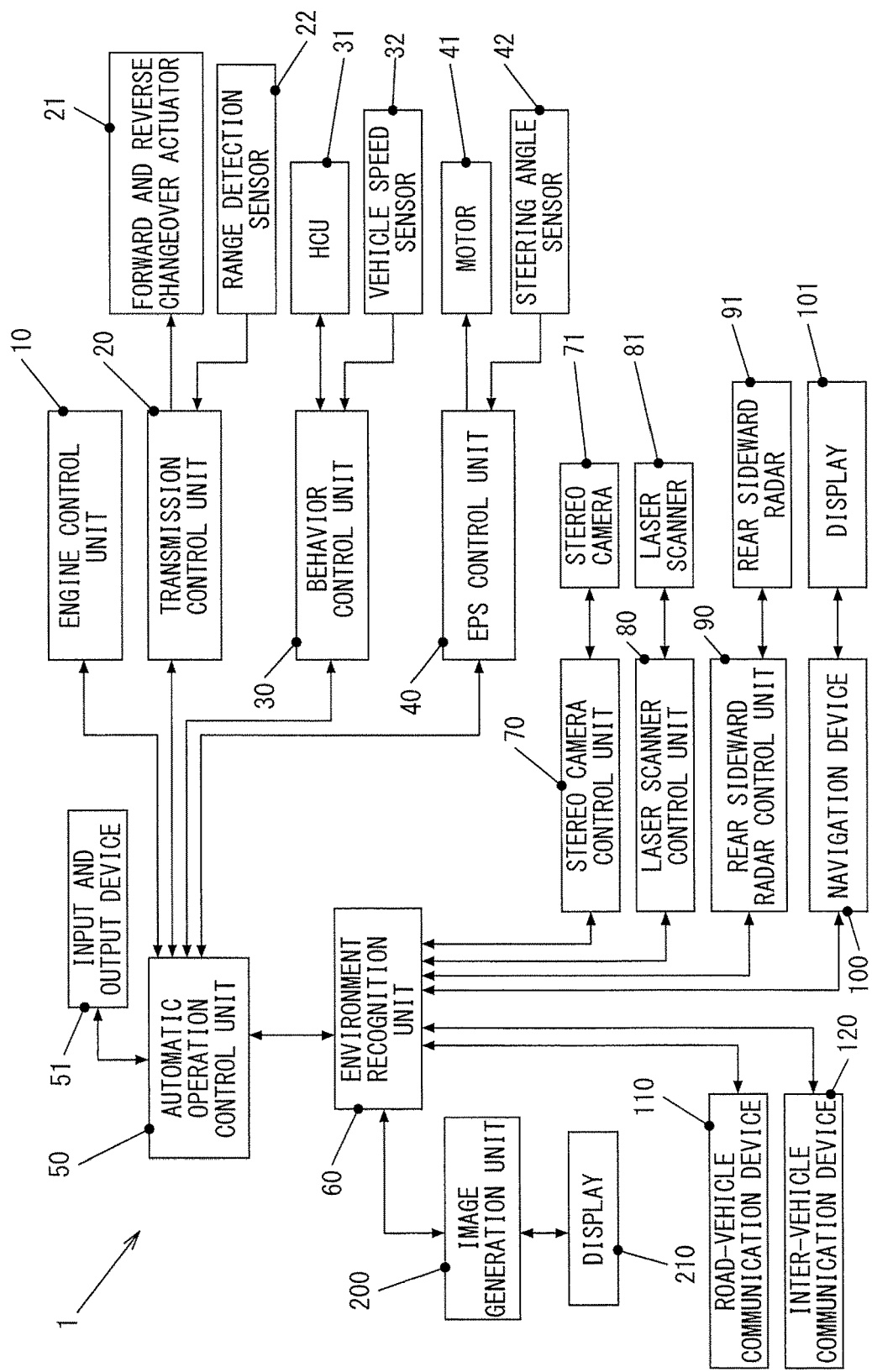
FIG. 1 is a block diagram schematically illustrating a configuration of a vehicle including a vehicle display device according to one implementation of the technology.

FIG. 1 is a block diagram schematically illustrating a configuration of a vehicle 1 provided with a vehicle display device according to one implementation of the technology.

The vehicle 1 may be, without limitation, an automobile such as a passenger car, and have a function of the automatic operation. The vehicle display device may be mounted on the vehicle 1. The vehicle display device may provide, without limitation, a user with display of information on an obstacle around the vehicle 1. The vehicle display device may also provide, without limitation, a user with display of an image regarding a target traveling line. Non-limiting examples of the user may include a driver in manual operation. Non-limiting examples of the obstacle may include another vehicle.

The user may be able to check a lane shape or the obstacle forward of the vehicle 1, on the basis of the information provided by the vehicle display device. In execution of an automatic operation function, the user may be able to verify validity of the target traveling line set by an automatic operation control, on the basis of the information provided by, the vehicle display device.

Referring to FIG. 1, the vehicle 1 may include, for example but not limited to, an engine control unit (ECU) 10, a transmission control unit (TCU) 20, a behavior control unit 30, an electric power steering (EPS) control unit 40, an automatic operation control unit 50, an environment recognition unit 60, a stereo camera control unit 70, a laser scanner control unit 80, a rear sideward radar control unit 90, a navigation device 100, a road-vehicle communication device 110, an inter-vehicle communication device 120, an image generation unit 200, and a display 210.

Each of the units as mentioned above may be a unit including, for example but not limited to, an information processor such as a central processing unit (CPU), a storage unit such as a random access memory (RAM) and a read only memory (ROM), an input and output interface, and a bus that couples them to one another. The units may be able to communicate with one another through an on-vehicle local area network (LAN) system such as a controller area network (CAN) communication system.

The engine control unit 10 may perform a general control of an engine and its auxiliaries. The engine may serve as a traveling power source of the vehicle 1.

As the engine, for example, a four-stroke gasoline engine may be used.

The engine control unit 10 may control, for example but not limited to, throttle valve opening, fuel injection quantity, fuel injection timing, and ignition timing of the engine, to control output torque of the engine.

In a state in which the vehicle 1 is operated in accordance with driving operation of the driver, the engine control unit 10 may control an output of the engine, to allow actual torque of the engine to approximate to torque requested by the driver. The torque requested by the driver may be set on the basis of, for example but not limited to, an operation amount of an accelerator pedal.

In a case of the automatic operation of the vehicle 1, the engine control unit 10 may control the output of the engine, in accordance with an instruction from the automatic operation control unit 50.

The transmission control unit 20 may perform a general control of an undepicted transmission and its auxiliaries. The transmission may change a rotation output of the engine, and make a forward and reverse changeover of the vehicle 1.

In the case of the automatic operation of the vehicle 1, the transmission control unit 20 may switch ranges regarding forward and reverse movements of the vehicle 1, and set a gear ratio, in accordance with an instruction from the automatic operation control unit 50.

As the transmission, various automatic transmissions may be used. Non-limiting examples may include a continuously variable transmission (CVT) of, for example but not limited to, a chain type, a belt type, or a toroidal type, a stepped automatic transmission (AT) including a plurality of planetary gear sets, a dual clutch transmission (DCT), and an automated manual transmission (AMT).

The transmission may include, for example but not limited to, a starting device and a forward and reverse changeover mechanism, besides a transmission mechanism such as a variator. Non-limiting examples of the starting device may include a torque converter, a dry clutch, and a wet clutch. The forward and reverse changeover mechanism may make a changeover between a forward traveling range and a reverse traveling range.

A forward and reverse changeover actuator 21 and a range detection sensor 22, without limitation, may be coupled to the transmission control unit 20.

The forward and reverse changeover actuator 21 may drive a forward and reverse changeover valve, to make the forward and reverse changeover of the vehicle 1. The forward and reverse changeover valve may switch oil paths for oil pressure supplied to the forward and reverse changeover mechanism.

The forward and reverse changeover actuator 21 may include, for example but not limited to, an electric actuator such as a solenoid.

The range detection sensor 22 may be a sensor or a switch that determines which range is currently selected in the transmission, the forward range or the reverse range.

The behavior control unit 30 may perform an individual control of a wheel cylinder hydraulic pressure of a hydraulic service brake, to perform a behavior control and an antilock brake control. The hydraulic service brake may be provided for each of a front left wheel, a front right wheel, a rear left wheel, and a rear right wheel. The behavior control may involve restraining vehicle behavior such as understeering and oversteering. The antilock brake control may involve making a recovery from a wheel lock in braking.

A hydraulic control unit (HCU) 31 and a vehicle speed sensor 32, without limitation, may be coupled to the behavior control unit 30.

The hydraulic control unit 31 may include, for example but not limited to, an electric pump and a valve. The electric pump may apply pressure to a brake fluid that serves as a working fluid of the hydraulic service brake. The valve may make an individual adjustment of the hydraulic pressure supplied to the wheel cylinder of each of the wheels.

In the case of the automatic operation of the vehicle 1, the hydraulic control unit 31 may generate braking power to the wheel cylinder of each of the wheels, in accordance with a braking instruction from the automatic operation control unit 50.

The vehicle speed sensor 32 may be provided in a hub of each of the wheels. The vehicle speed sensor 32 may generate a vehicle speed pulse signal having a frequency proportional to a rotation speed of the wheel.

The vehicle speed sensor 32 may detect the frequency of the vehicle speed pulse signal. The vehicle speed sensor 32 may perform predetermined operation processing on the basis of the frequency of the vehicle speed pulse signal, to calculate a traveling speed of the vehicle 1, i.e., a vehicle speed.

The electric power steering control unit 40 may perform a general control of an electric power steering device and its auxiliaries. The electric power steering device may include an electric motor, and provide assistance with steering operation of the driver with use of the electric motor.

A motor 41 and a steering angle sensor 42, without limitation, may be coupled to the electric power steering control unit 40.

The motor 41 may serve as an electric actuator that applies assisting power to a steering system of the vehicle 1, to provide the assistance with the steering operation of the driver, and changes a steering angle in the automatic operation.

In the case of the automatic operation of the vehicle 1, the motor 41 may impart, in accordance with a steering instruction from the automatic operation control unit 50, torque to the steering system, to allow the steering angle of the steering system to approximate to a predetermined target steering angle. The motor 41 may thereby cause the steering system to perform steering.

The steering angle sensor 42 may detect a current steering angle in the steering system of the vehicle 1.

The steering angle sensor 42 may include, for example but not limited to, a position encoder that detects an angular position of a steering shaft.

The automatic operation control unit 50 may output a control instruction to, for example but not limited to, the engine control unit 10, the transmission control unit 20, the behavior control unit 30, and the electric power steering control unit 40 as mentioned above, to execute the automatic operation control, in a case in which an automatic operation mode is selected. The automatic operation control may involve allowing the vehicle 1 to travel automatically.

In one implementation of the technology, the automatic operation control unit 50 may serve as an "automatic operation control unit" and a "traveling line setting unit".

The automatic operation control unit 50 may set the target traveling line, upon the selection of the automatic operation mode. The target traveling line may be a traveling line along which the vehicle 1 ought to travel. The setting of the target traveling line may be provided in accordance with, for example but not limited to, information regarding environment, i.e., situation around the own vehicle, and an instruction from the undepicted driver. The environment includes the road forward of the vehicle 1. The information regarding the environment may be supplied from the environment recognition unit 60. The automatic operation control unit 50 may automatically perform, for example but not limited to, acceleration or starting of the vehicle 1, deceleration or stopping of the vehicle 1, the forward and reverse changeover, and the steering. The automatic operation control unit 50 may thereby execute the automatic operation that allows the vehicle 1 to automatically travel along the target traveling line to a pre-set destination.

The automatic operation mode may be stopped, and thereby be able to return to a manual operation mode, in accordance with a predetermined cancel operation from the user. The return to the manual operation mode may be carried out at a desire of the user for manual operation, or alternatively in a case in which continuation of the automatic operation is difficult. The manual operation mode refers to a mode in which the manual operation by the driver is performed.

An input and output device 51 may be coupled to the automatic operation control unit 50.

The input and output device 51 may output information such as an alarm and various messages to the user from the automatic operation control unit 50. The input and output device 51 may also accept an input of various operations from the user.

The input and output device 51 may include, for example but not limited to, an image display device such as a liquid crystal display (LCD), a sound output device such as a speaker, and an operation input device such as a touch panel.

The environment recognition unit 60 may recognize information on surroundings of the vehicle 1.

In one implementation of the technology, the environment recognition unit 60 may serve as an "environment recognition unit".

The environment recognition unit 60 may recognize the environment including the road forward of the vehicle 1. In one specific but non-limiting example, the environment recognition unit 60 may recognize the obstacle around the vehicle 1, and the lane shape of the road on which the vehicle 1 is traveling, on the basis of information supplied from, for example but not limited to, the stereo camera control unit 70, the laser scanner control unit 80, the rear sideward radar control unit 90, the navigation device 100, the road-vehicle communication device 110, and the inter-vehicle communication device 120. Non-limiting examples of the obstacle may include a stopped vehicle, a traveling vehicle, a building, a geographical feature, a pedestrian, and a cyclist.

The stereo camera control unit 70 may control the stereo cameras 71. The stereo cameras 71 may be provided, in a plurality of pairs, around the vehicle 1. The stereo camera control unit 70 may perform image processing on an image transmitted from the plurality of pairs of the stereo cameras 71.

Each of the stereo cameras 71 may include, without limitation, a pair of camera units arranged side by side. The camera units may each include, without limitation, an imaging optical system such as a lens, a solid-state imaging element such as a complementary metal oxide semiconductor (CMOS) image sensor, a driver circuit, and a signal processing device.

The stereo camera control unit 70 may recognize a shape of an object captured by the stereo cameras 71 and a relative position to the vehicle 1 of the object, on the basis of a result of the image processing with utilization of a known stereo image processing technique.

In one specific but non-limiting example, the stereo camera control unit 70 may detect lane lines on both sides of the lane forward of the vehicle 1, and thereby recognize the lane shape.

The laser scanner control unit 80 may control the laser scanners 81. The laser scanner control unit 80 may recognize various objects as three-dimensional (3D) point group data, on the basis of an output of the laser scanners 81. Non-limiting examples of the various objects may include another vehicle and the obstacle around the vehicle 1.

The rear sideward radar control unit 90 may control the rear sideward radar 91. The rear sideward radar 91 may be provided on right and left side parts of the vehicle 1. The rear sideward radar control unit 90 may detect an object rear sideward of the vehicle 1, on the basis of an output of the rear sideward radar 91.

The rear sideward radar 91 may be able to detect, for example but not limited to, another vehicle that approaches the vehicle 1 from rear sideward of the vehicle 1.

As the rear sideward radar 91, radar such as laser radar and millimeter-wave radar may be used.

Figure 2:
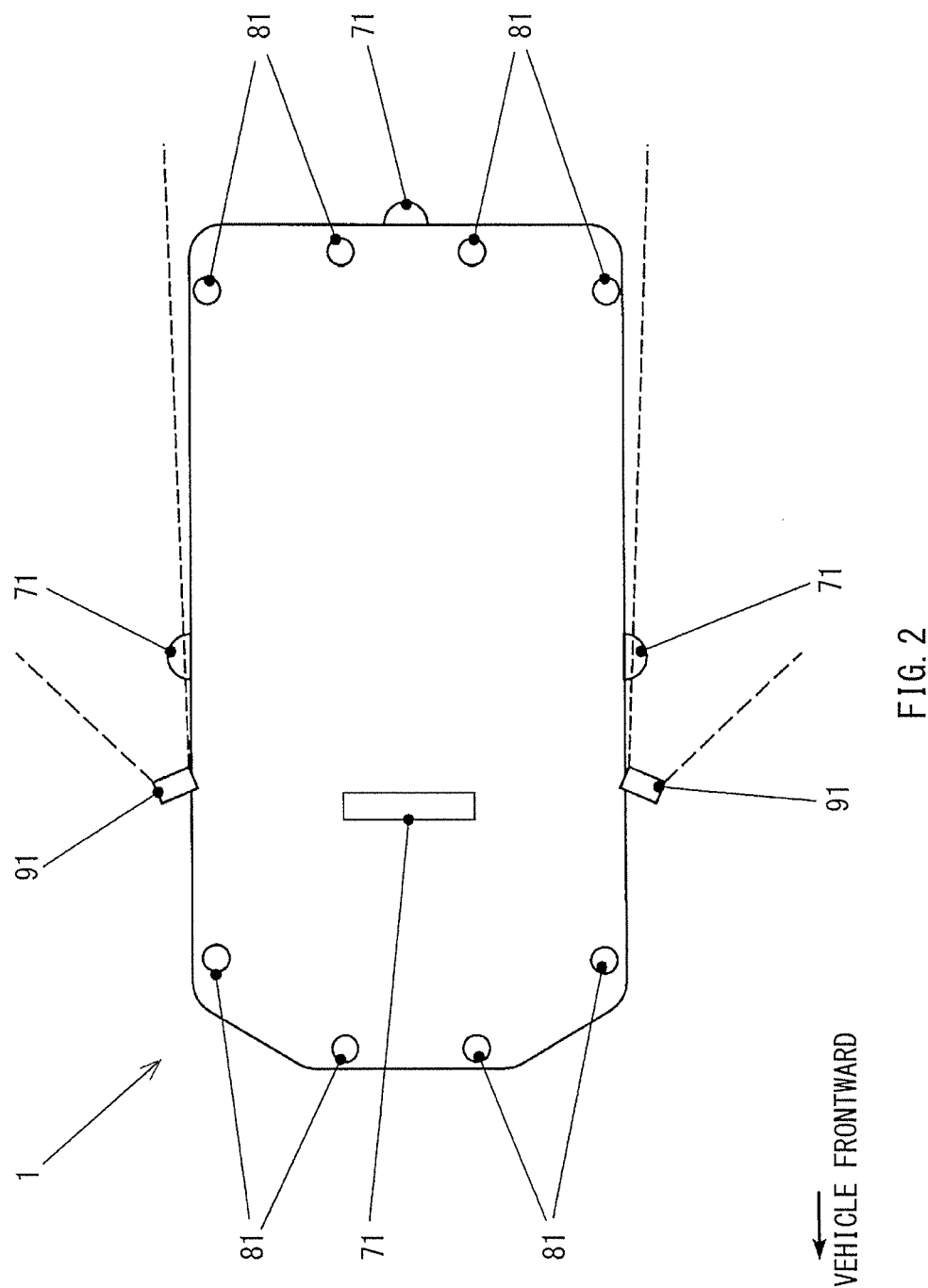
FIG. 2 schematically illustrates disposition of sensors that recognize a periphery of the vehicle illustrated in FIG. 1.

FIG. 2 provides schematic illustration of disposition of the sensors that recognize the surroundings of the vehicle 1 illustrated in FIG. 1.

The stereo cameras 71 may be disposed in a front part, a rear part, and the right and left side parts of the vehicle 1.

The laser scanners 81 may be provided in a plurality, to substantially prevent a dead angle around the vehicle 1.

The rear sideward radar 91 may be disposed on, for example but not limited to, the right and left side parts of a vehicle body of the vehicle 1, with its detection range directed rear outward in a width direction of the vehicle 1.

The navigation device 100 may include, for example but not limited to, an own-vehicle positioning unit such as a global positioning system (GPS) receiver, a data accumulation unit, and a gyro sensor. The data accumulation unit may accumulate map data prepared in advance. The gyro sensor may detect an azimuth of a front and rear direction of the vehicle 1.

The map data may include, without limitation, road information at lane level. Non-limiting examples of the road information may include the road, an intersection, and an interchange. The road information may further include, for example but not limited to, information regarding the lanes.

The road information may include not only three-dimensional data of the lane shape but also information on traveling restriction such as permission or non-permission to make a right turn or a left turn, a temporary stop position, and a speed limit of each lane.

The navigation device 100 may include a display 101. The display 101 may be incorporated in an instrumental panel.

The display 101 may be an image display device that displays various pieces of information outputted to the driver by the navigation device 100.

The display 101 may include a touch panel, and serve as an input unit on which various operation inputs from the driver may be made.

The road-vehicle communication device 110 may communicate with an undepicted ground station by a communication system in conformity with a predetermined standard. The road-vehicle communication device 110 may thereby acquire information regarding, for example but not limited to, traffic congestion, lighting states of traffic signals, road construction, a scene of a traffic accident, lane regulation, weather, and road surface conditions.

The inter-vehicle communication device 120 may communicate with another vehicle undepicted, by a communication system in conformity with a predetermined standard. The inter-vehicle communication device 120 may thereby acquire information on a vehicle state of another vehicle, and also acquire information on a vehicle attribute of another vehicle. Non-limiting examples of the information on the vehicle state of another vehicle may include a position, an azimuth angle, acceleration, and a speed of another vehicle. Non-limiting examples of the information on the vehicle attribute of another vehicle may include a vehicle model and a vehicle size of another vehicle.

The image generation unit 200 may generate an environment image, on the basis of a result of environment recognition transmitted from the environment recognition unit 60. The environment image may be an image that includes information regarding the environment around the vehicle 1. The environment image may be displayed on the display 210.

The display 210 may be an image display device disposed in confronted relation to the occupant of the vehicle.

In one implementation of the technology, the display 210 may serve as a "display unit".

In one implementation of the technology, the image generation unit 200 and the display 210 may serve as a "vehicle display device".

The display 210 may include, for example but not limited to, a liquid crystal display (LCD) incorporated in an interior member such as the instrumental panel.

Description is given next of image display operation of the vehicle display device, and examples of image display.

Figure 3:
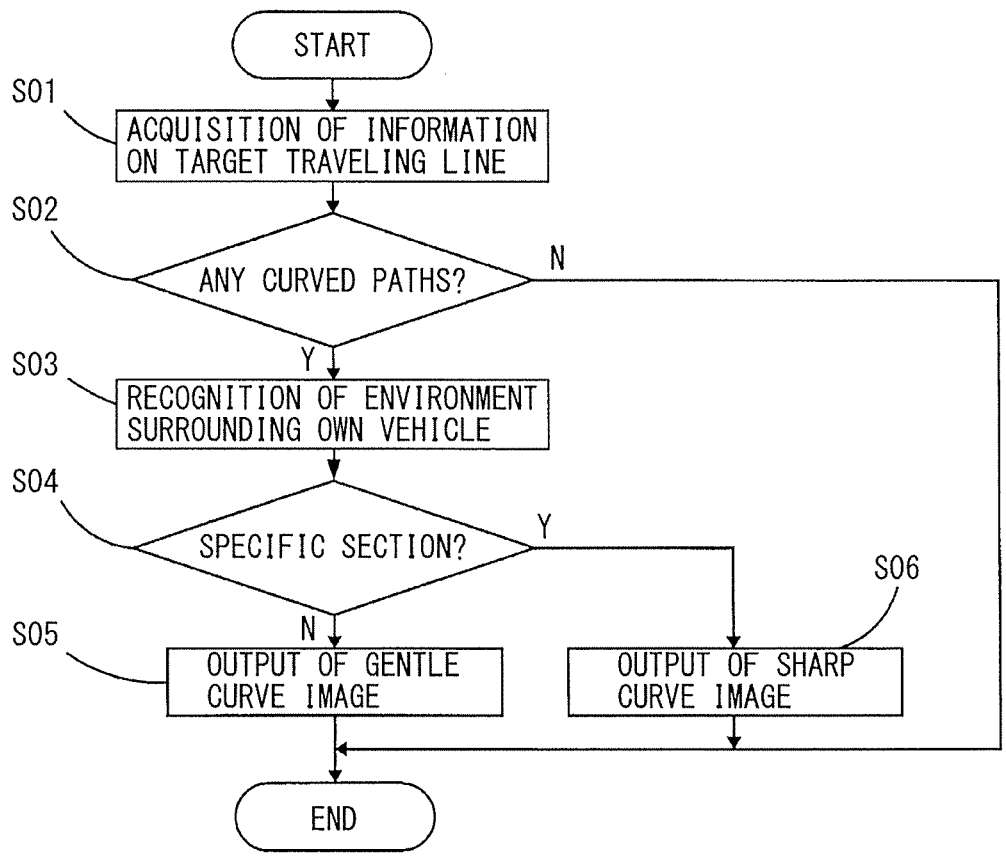
FIG. 3 is a flowchart illustrating operation of the vehicle display device.

FIG. 3 is a flowchart of the operation of the vehicle display device.

The operation of the vehicle display device described below may be carried out while the vehicle 1 is automatically traveling on a high-standard road such as a highway and an expressway, without limitation.

In the following, description is given of the operation of the vehicle display device in the order of a sequence of steps.

[Step S01: Acquisition of Information on Target Traveling Line]

The image generation unit 200 may acquire, from the automatic operation control unit 50, information on the target traveling line currently set in the automatic operation control.

Thereafter, the flow may proceed to step S02.

[Step S02: Determination on Presence or Absence of Curved Path]

The image generation unit 200 may detect, on the basis of the information acquired in step S01, a curve included in the target traveling line. The image generation unit 200 may thereby determine whether or not there is a planned passage of the vehicle 1 through a curved path in the near future, e.g., within a predetermined time threshold. The curve has a curvature corresponding to the curved path.

With the planned passage of the vehicle 1 through the curved path (Y in step S02), the flow may proceed to step S03. When there is no planned passage of the vehicle 1 through the curved path (N in step S02), a series of processing may be ended, or the flow may be allowed to return.

In one implementation of the technology, the image generation unit 200 may serve as a "curve detection unit".

[Step S03: Recognition of Environment Surrounding Own Vehicle]

The environment recognition unit 60 may acquire the information on the environment surrounding the vehicle 1, with utilization of, for example but not limited to, the stereo cameras 71. The environment includes the road forward of the vehicle 1.

At this occasion, the environment recognition unit 60 may acquire information regarding which the curved path detected in step S02 is, a specific section or an ordinary section.

The specific section may correspond to, for example but not limited to, a section corresponding to a state of a road including a branch or a joint, or both on a high-standard road. In one specific but non-limiting example, the specific section may include an interchange, a junction, a service area, and a car park, without limitation.

The ordinary section may correspond to, for example but not limited to, a section corresponding to a state of a road that is devoid of the branch and the joint on the high-standard road. In other words, the ordinary section may be other sections than the specific section. In one specific but non-limiting example, the ordinary section may be a section in a case as where the vehicle 1 is ordinarily traveling on the high-standard road.

Setting of the specific section may be provided in consideration of higher possibility of emergence of the curved path having the larger curvature than the curvature of the ordinary section, i.e., the sharp curve.

In one implementation of the technology, the specific section may serve as a "second road state". In one implementation of the technology, the ordinary section may serve as a "first road state".

Thereafter, the flow may proceed to step S04.

[Step S04: Determination on Specific Section]

The image generation unit 200 may determine, on the basis of a recognition result of the environment recognition unit 60, which the curve included in the road or the target traveling line forward of the vehicle 1 is, the curve included in the ordinary section or the curve included in the specific section. In one specific but non-limiting example, the image generation unit 200 may categorize, on the basis of the detection result of the curve included in the target traveling line as mentioned above, the state of the road on which the target traveling line including the curve is set, in one class out of a plurality of classes, according to possibility of presence of the curve having the curvature of a predetermined value or more. In this example, the image generation unit 200 may categorize the state of the road in one class out of two classes, i.e., the specific section and the ordinary section.

When the curve included in the target traveling line is the curve included in the specific section (Y in step S04), the flow may proceed to step S06. When the curve included in the target traveling line is not the curve included in the specific section (N in step S04), the flow may proceed to step S05.

In one implementation of the technology, the image generation unit 200 may serve as a "road state categorization unit".

[Step S05: Output of Gentle Curve Image]

The image generation unit 200 may generate the environment image, as overhead view of the vehicle 1 and a road shape, i.e., the lane shape, forward of the vehicle 1. In one specific but non-limiting example, the image generation unit 200 may generate, on the basis of a categorization result of the state of the road as mentioned above, an image that indicates the curvature of the curve. The image corresponds to the class in which the state of the road has been categorized, i.e., the ordinary section.

The environment image may be generated as, for example but not limited to, computer graphics simplified with details omitted.

The image generation unit 200 may include a rendering engine that is able to perform generation of such an image.

The image generation unit 200 may also provide a gentle curve image in superimposed relation to a part of the environment image. The gentle curve image may be an image that indicates presence of the curved path shaped as a gentle curve forward of the vehicle 1.

The image generation unit 200 may allow the display 210 to display the image as described above. The series of processing may thereby be ended, or the flow may be allowed to return.

[Step S06: Output of Sharp Curve Image]

The image generation unit 200 may generate, on the basis of the categorization result of the state of the road as mentioned above, an image that indicates the curvature of the curve. The image corresponds to the class in which the state of the road has been categorized, i.e., the specific section. The image generation unit 200 may provide a sharp curve image in the superimposed relation to a part of the environment image. The sharp curve image may be an image that indicates presence of the curved path shaped as a sharp curve forward of the vehicle 1. The environment image may be substantially similar to that of step S05.

The image generation unit 200 may allow the display 210 to display the image as described above. The series of processing may thereby be ended, or the flow may be allowed to return.

In the following, description is given of specific but non-limiting examples of the images displayed by the vehicle display device.

Figure 4:
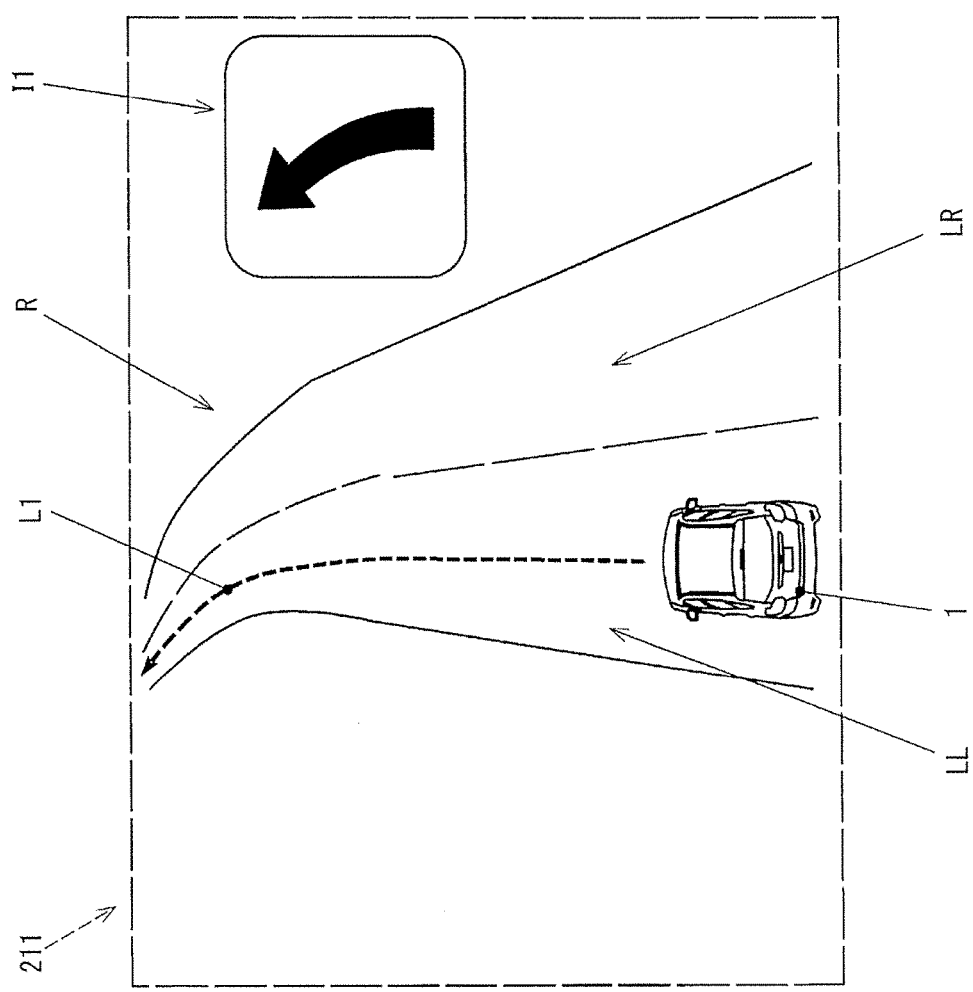
FIG. 4 illustrates one example of an image displayed by the vehicle display device.

FIG. 4 illustrates one example of the image displayed by the vehicle display device.

A display image 211 may be displayed on the display 210, and include images regarding the vehicle 1 and a road R.

The road R may be a road that includes two lanes, e.g., a right-side lane LR and a left-side lane LL, on each side. The road R may be, for example but not limited to, the high-standard road such as the highway.

The vehicle 1 may be traveling on the left-side lane LL.

The road R may be, forward of the vehicle 1, a road that curves to the left at a relatively small curvature, i.e., the curved path that gently curves to the left.

FIG. 4 illustrates a target traveling line L1 utilized in the automatic operation control, for reference purposes.

In practice, however, the target traveling line L1 may not be displayed on the display 210.

In the example illustrated in FIG. 4, in step S03 in FIG. 3, the curve included in the road or the target traveling line forward of the vehicle 1 may be categorized as the curve included in the ordinary section. In one implementation of the technology, the ordinary section may serve as a "first road state".

Accordingly, the gentle curve image I1 may be displayed in a part of the display image 211.

The gentle curve image I1 may utilize a pattern of an arrow that is relatively gently curved to the left, thereby meaning that the vehicle 1 is going to travel along a gently curved line to the left. In the gentle curve image I1, for example, the gently curved line to the left may indicate the curvature of the curve included in the target traveling line, while a point of the arrow may indicate a direction of the curve.

Figure 5:
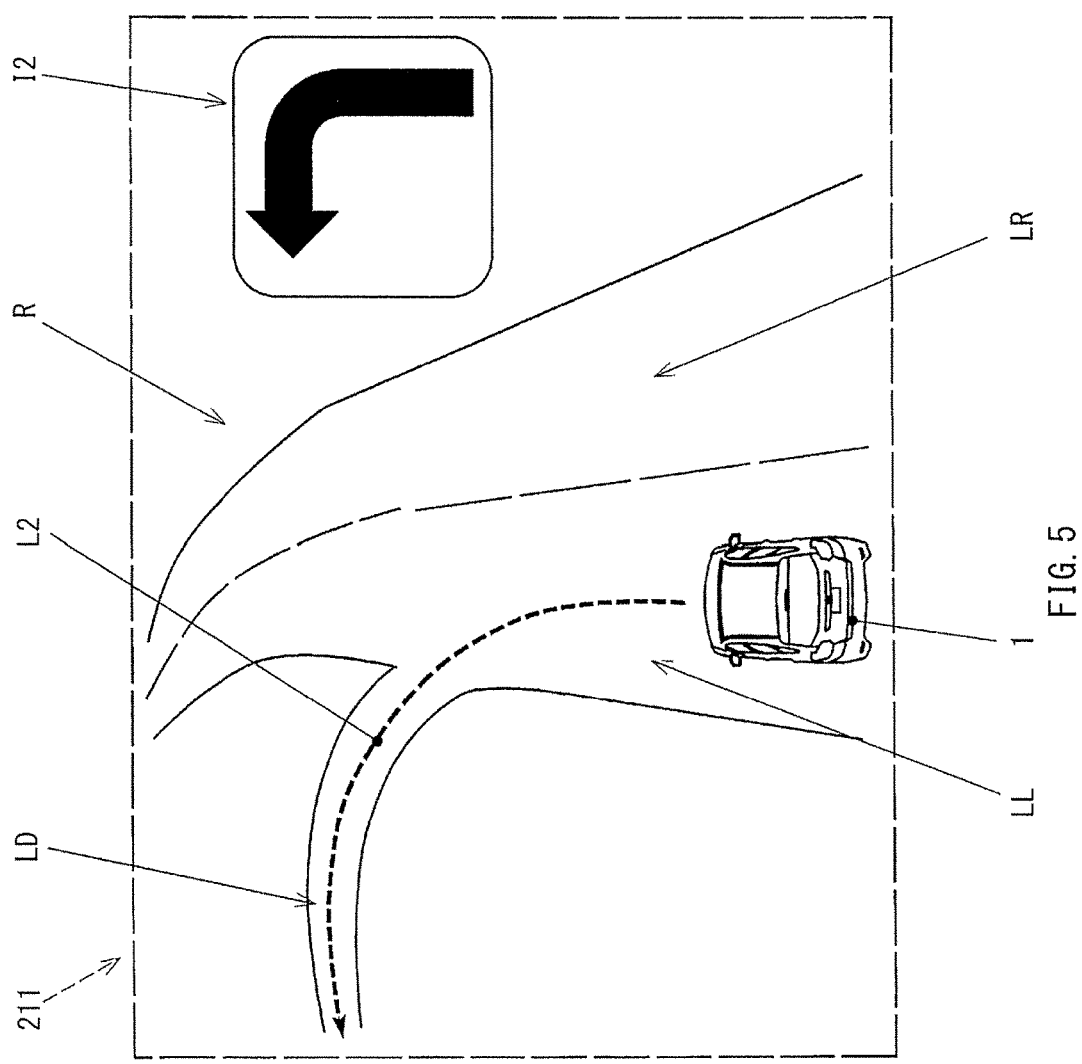
FIG. 5 illustrates another example of the image displayed by the vehicle display device.

FIG. 5 illustrates another example of the image displayed by the vehicle display device.

In FIG. 5, substantially similar parts to those of FIG. 4 are denoted by same reference characters. In what follows, description is mainly given of differences from FIG. 4, and description of the substantially similar parts to those of FIG. 4 is omitted.

In FIG. 5, a branch lane LD may be provided on the left-side lane LL. The branch lane LD may diverge to the left from the left-side lane LL. A target traveling line L2 of the vehicle 1 may be so set as to converge on the branch lane LD and thereafter to allow the vehicle 1 to travel along the branch lane LD. Note that in practice, the target traveling line L2 may not be displayed either.

The branch lane LD may be the road that curves to the left at a larger curvature than that of a main lane, i.e., the right-side lane LR and the left-side lane LL. In other words, the branch lane LD may be the curved path that sharply curves to the left.

In the example illustrated in FIG. 5, in step S03 in FIG. 3, the curve included in the road or the target traveling line forward of the vehicle 1 may be categorized as the curve included in the specific section. The specific section may have the higher possibility of the presence of the curve having the larger curvature than that of the curve included in the ordinary section.

Accordingly, the sharp curve image I2 may be provided in a part of the display image 211.

The sharp curve image I2 may have a larger curvature than that of the arrow presented in the gentle curve image I1. Accordingly, the sharp curve image I2 may utilize a pattern of an arrow curved more sharply than the arrow presented in the gentle curve image I1, thereby meaning that the vehicle 1 is going to travel along a sharply curved line to the left. In the sharp curve image I2, for example, the sharply curved line to the left may indicate the curvature of the curve included in the target traveling line, and the point of the arrow may indicate the direction of the curve.

As described, according to the vehicle display device of one implementation of the technology, it is possible to produce effects as follows.

(A) The gentleness and the sharpness of the curved path through which the vehicle 1 is going to pass in the future may be displayed in a classified manner, e.g., in the two classes, according to the state of the curved path. Hence, it is possible to alleviate the burden of the supervision on the occupant in the automatic operation. In this case, in particular, it is demonstrated that the vehicle 1 normally recognizes the curved path ahead. This makes it possible to maintain the trust in the automatic operation control. Moreover, it is possible to draw the user's attention prior to the passage of the vehicle 1 through the curved path having the large curvature, i.e., the curved path along which generation of relatively large lateral acceleration is foreseen.

(B) Not only the gentleness and the sharpness of the curved path but also the direction of the curved path, e.g., the right and the left directions, may be indicated. Hence, it is possible to give the user a clear recognition that the automatic operation control is normally functioning, with little increase in the burden of the supervision.

(C) The state of the road may be categorized in one class out of the two classes, according to the presence or the absence of, for example but not limited to, the joint or the branch, or both, on the high-standard road. In accordance with the categorization result, the kinds of the images regarding the gentleness and the sharpness of the curved path may be switched between the gentle curve image I1 and the sharp curve image I2. Hence, it is possible to produce the effects as described above, with simple configurations, e.g., simple processing and simple images.

[Modifications]

The technology is by no means limited to the implementations of the vehicle display device as described above. It should be appreciated that modifications and alterations may be made, and the technology is intended to include such modifications and alterations.

(A) The configurations of the vehicle display device or the configurations of the vehicle 1 are not limited to the configurations as described in the forgoing implementations, but may be modified or altered as appropriate. In the forgoing implementations, the vehicle 1 may be a passenger car, but in one alternative, the vehicle 1 may be a commercial vehicle such as a cargo vehicle, a truck, a bus, a motorcycle, and other various special vehicles.

(B) In the forgoing implementations, the vehicle 1 may utilize the engine as the traveling power source. However, this is non-limiting. In one alternative, the vehicle 1 may utilize an electric motor as the traveling power source. In another alternative, the vehicle 1 may utilize, as the traveling power source, a hybrid system as a combination of the engine and the electric motor.

(C) The kinds or the disposition of the sensors that recognize the environment around the vehicle 1 are not limited to the kinds or the disposition as described in the forgoing implementations, but may be modified or altered as appropriate. For example, various sensors may be utilized together with, or may be replaced with, the sensors as described above. Non-limiting examples of the various sensors may include the millimeter-wave radar, the laser radar, a monocular camera, and ultrasonic sonar.

(D) In the forgoing implementations, the image may be provided in the overhead view image or in a bird's eye view image, but this is non-limiting. In one alternative example, the image may be provided in a plan view image, or in a driver's view image as viewed from a viewpoint of a virtual driver. In another alternative, a 3D image may be displayed using a display that is able to provide 3D display. Moreover, in the forgoing implementations, the image may be displayed on the display incorporated in the instrumental panel, but this is non-limiting. In one alternative example, the image may be displayed with a head up display that projects the image on a front windshield.

(E) In the forgoing implementations, the state of the road may be categorized in one class out of the two classes, i.e., the ordinary section and the specific section. However, this is non-limiting. The state of the road may be categorized in one class out of three or more classes. In this case, the image that indicates the curvature of the curve may be displayed, and the image may correspond to the class in which the state of the road categorized in one class out of the three or more classes.

In one implementation described above, the image generation unit 200 illustrated in FIG. 1 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the image generation unit 200. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIG. 1.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle display device mounted on a vehicle, wherein the vehicle includes at least one first processor programmed to: recognize environment including a road forward of the vehicle; set a target traveling line of the vehicle based on a recognition result; and control the vehicle to travel along the target traveling line, the vehicle display device comprising:
at least one second processor programmed to:
detect a curve in the target traveling line;
determine whether the detected curve in the target traveling line is on a first section or a second section of a high-standard road, the first section being a road devoid of a branch and a joint on the high-standard road, the second section being a road including at least the branch or the joint on the high-standard road; and
display a first symbol assigned to the determined first section or a second symbol assigned to the determined second section on a display,
wherein the first symbol assigned to the first section comprises a first curvature,
wherein the second symbol assigned to the second section comprises a second curvature, and wherein the second curvature of the second symbol is larger than the first curvature of the first symbol.

2. The vehicle display device according to claim 1, wherein the second processor is programmed to display:
as the first symbol, a first arrow 1) having the first curvature and a first predetermined radius of curvature and 2) showing a direction of the curve; and
as the second symbol, a second arrow 1) having the second curvature and a second predetermined radius of curvature and 2) showing the direction of the curve.

* * * * *